United States Patent [19]

Williams

[11] 4,319,812
[45] Mar. 16, 1982

[54] AUDIO-VISUAL SYSTEMS AND METHODS

[75] Inventor: Albert M. Williams, Los Angeles, Calif.

[73] Assignee: Technicolor Corporation, Hollywood, Calif.

[21] Appl. No.: 665,097

[22] Filed: Mar. 8, 1976

[51] Int. Cl.³ .............................................. G03B 31/04
[52] U.S. Cl. ..................................... 352/31; 352/17; 352/20; 352/92; 352/69
[58] Field of Search ...................... 352/17, 20, 31, 92, 352/12, 5, 15, 16, 19, 69

[56] References Cited

U.S. PATENT DOCUMENTS

| | | | |
|---|---|---|---|
| 1,422,527 | 7/1922 | Berger | 350/132 |
| 1,696,968 | 1/1929 | Outrey | 352/92 |
| 1,879,793 | 9/1932 | Chubb | 350/132 |
| 1,944,024 | 1/1934 | Foster | 352/124 |
| 1,969,465 | 8/1934 | Jones . | |
| 2,526,516 | 10/1950 | Supitilov . | |
| 2,551,349 | 5/1951 | Supitilov . | |
| 2,606,476 | 8/1952 | Waller | 352/17 |
| 2,618,197 | 11/1952 | Boushey . | |
| 2,653,508 | 9/1953 | Whiteley . | |
| 2,843,006 | 7/1958 | Tyler | 352/109 |
| 3,033,077 | 5/1962 | Schwartz et al. . | |
| 3,181,421 | 5/1965 | Nimke | 352/17 |
| 3,301,628 | 1/1967 | Hellmund | 352/92 |
| 3,309,163 | 3/1967 | White | 352/92 |
| 3,432,228 | 3/1969 | Hellmund . | |
| 3,447,864 | 6/1969 | Shadley . | |
| 3,475,088 | 10/1969 | Salia . | |
| 3,508,817 | 4/1970 | Hnilicka . | |
| 3,515,470 | 6/1970 | Browder | 352/92 |
| 3,520,596 | 7/1970 | O'Donnell et al. . | |
| 3,524,573 | 8/1970 | Kotler | 226/62 |
| 3,539,248 | 11/1970 | Lancor . | |
| 3,544,207 | 12/1970 | John | 352/92 |
| 3,591,265 | 7/1971 | Shropshire . | |
| 3,609,019 | 9/1971 | Tuber . | |
| 3,620,609 | 11/1971 | John . | |
| 3,622,229 | 11/1971 | John . | |
| 3,664,735 | 5/1972 | Metzger . | |
| 3,674,346 | 4/1972 | Lancor | 352/19 |
| 3,677,627 | 7/1972 | Johnston | 352/109 |
| 3,690,746 | 9/1972 | Kotler | 352/12 |
| 3,692,390 | 9/1972 | Siegel . | |
| 3,702,730 | 11/1972 | Russell | 352/194 |
| 3,704,999 | 12/1972 | Hutner . | |
| 3,713,733 | 1/1973 | Johnston . | |
| 3,722,987 | 3/1973 | Cap et al. . | |
| 3,733,117 | 5/1973 | Ogiso et al. . | |
| 3,779,632 | 12/1973 | Caraway . | |
| 3,782,811 | 1/1974 | Badalich et al. . | |
| 3,788,736 | 1/1974 | Oulevay | 352/92 |
| 3,794,416 | 2/1974 | Johnston . | |
| 3,804,497 | 4/1974 | Ogiso et al. . | |
| 3,811,768 | 5/1974 | Zahn et al. . | |
| 3,826,566 | 7/1974 | Csontos . | |
| 3,938,194 | 2/1976 | Freudenschuss | 352/12 |

OTHER PUBLICATIONS

IBM Technical Disclosure Bulletin, vol. II, No. 10, 3-69.

Primary Examiner—Monroe H. Hayes
Attorney, Agent, or Firm—Shapiro and Shapiro

[57] ABSTRACT

Audio-visual systems including a motion picture film projector and a tape player, the film having optical cues and program reference notches for stopping film advancement, and the tape having start cues for starting film advancement. The optical stop cues are detected dynamically and with cue length discrimination. A program select control causes the system to search for a program reference notch and to ignore optical stop cue until the notch is detected. Other features include a pause-run control, a variable frame rate control with a single-frame advance option, and remote controls. Optical stop cue detection systems include a light transmissive system, a light reflective system, a polarized light system, and a colored light system.

32 Claims, 24 Drawing Figures

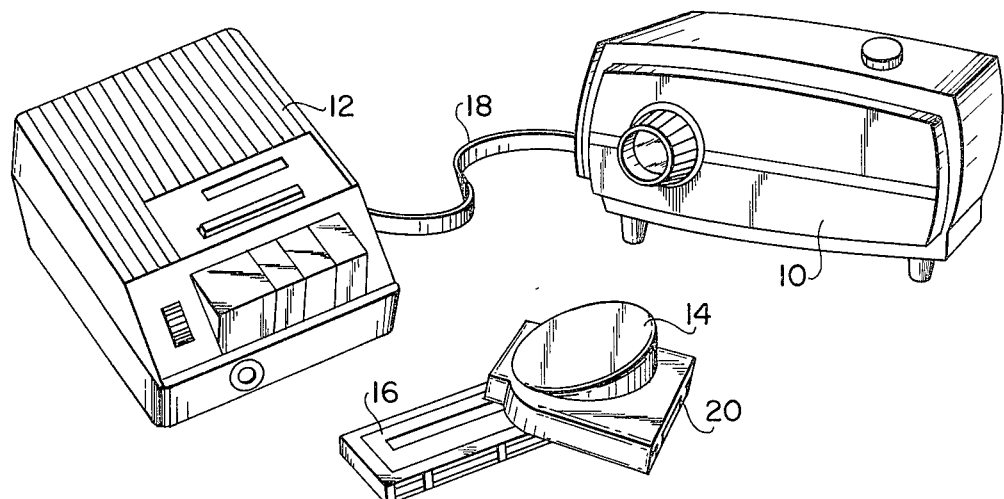
FIG. 1
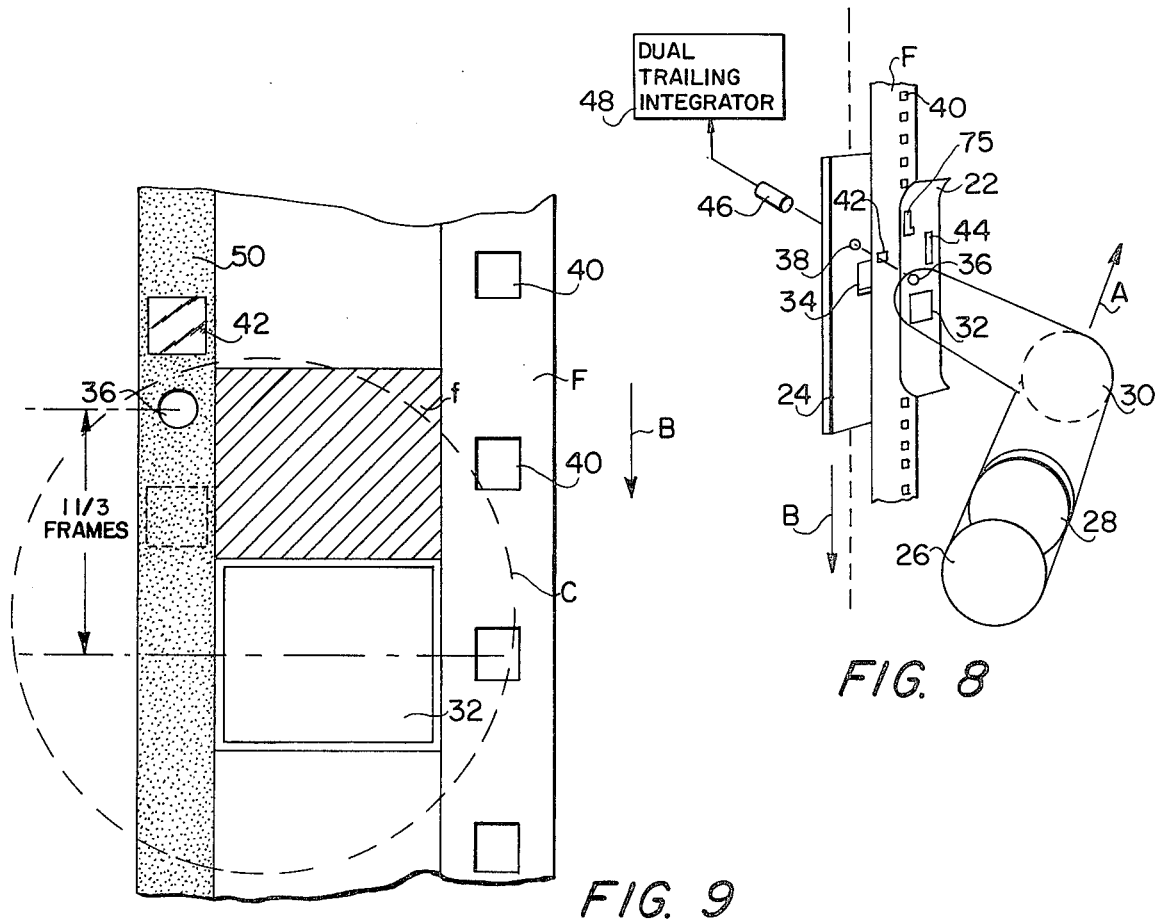
FIG. 8
FIG. 9

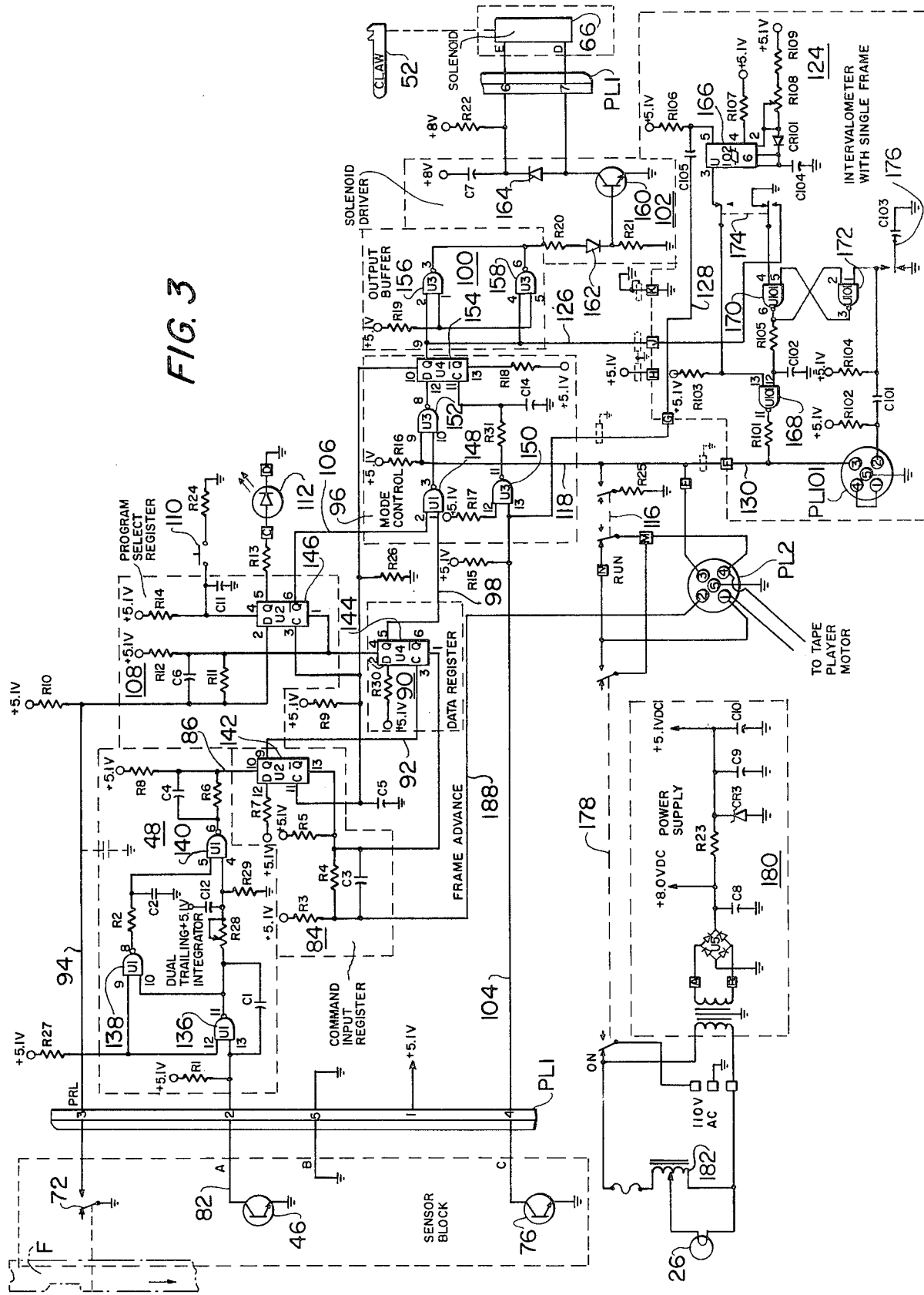

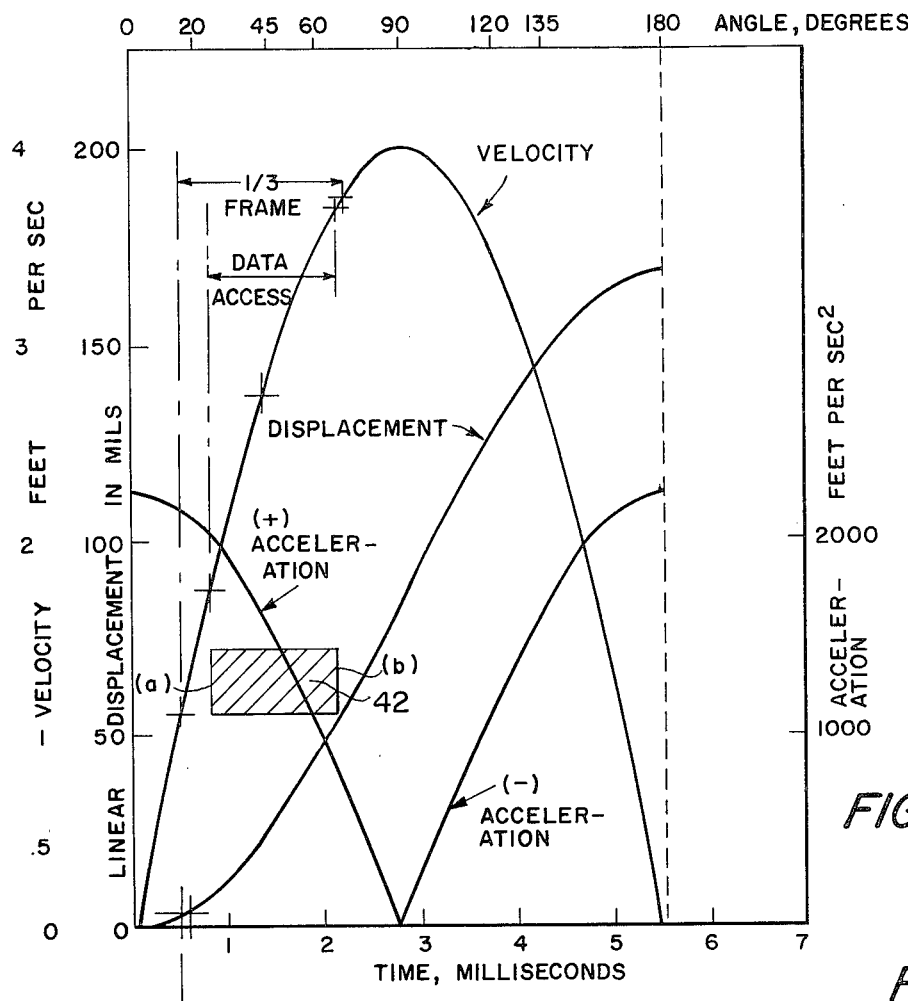
FIG. 10
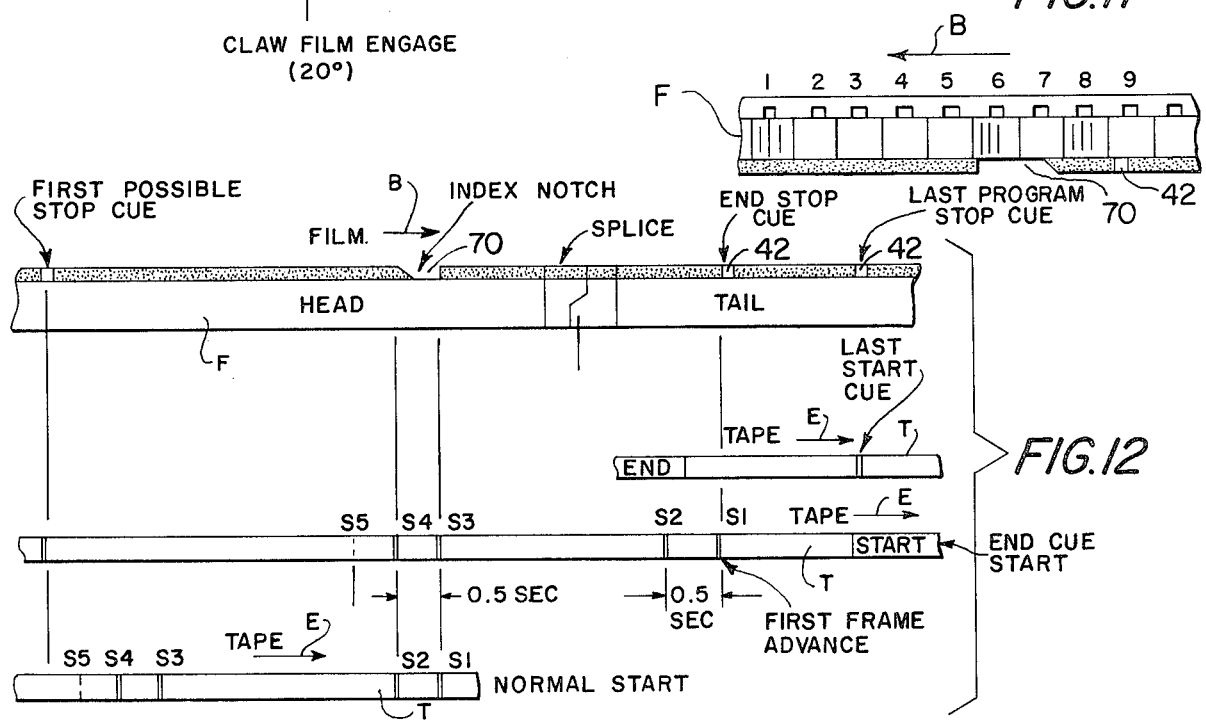
FIG. 11
FIG. 12

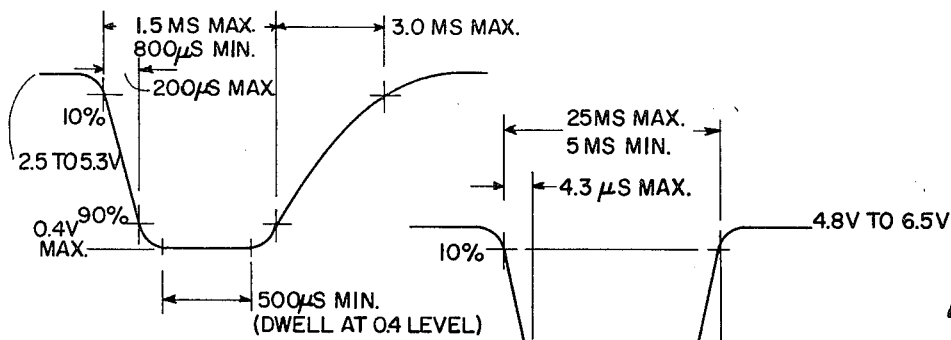
FIG. 13A
FIG. 13B
FIG. 13C
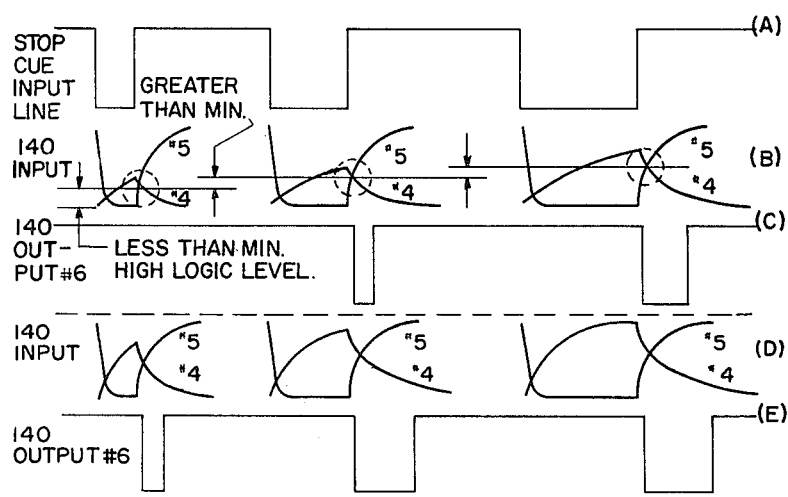
FIG. 14
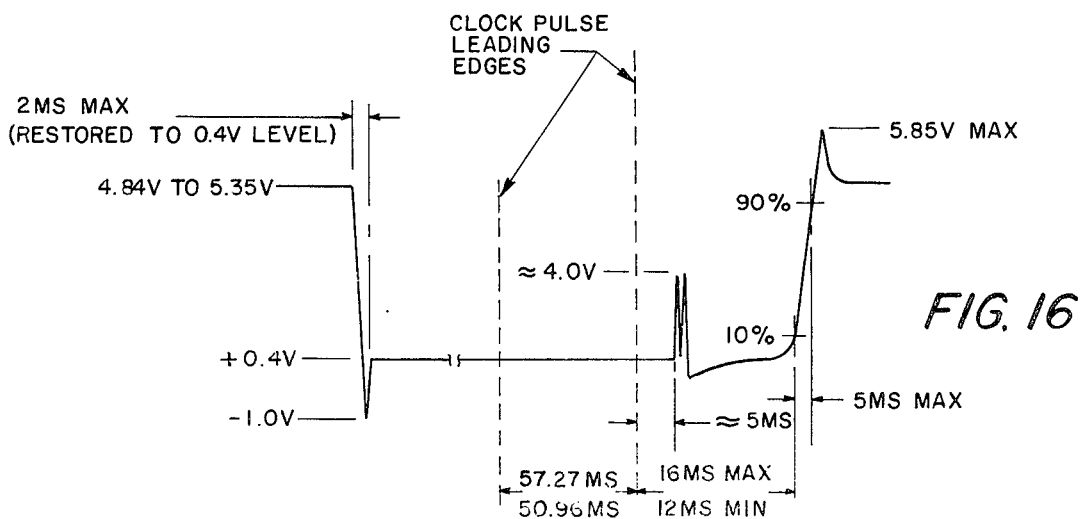
FIG. 16

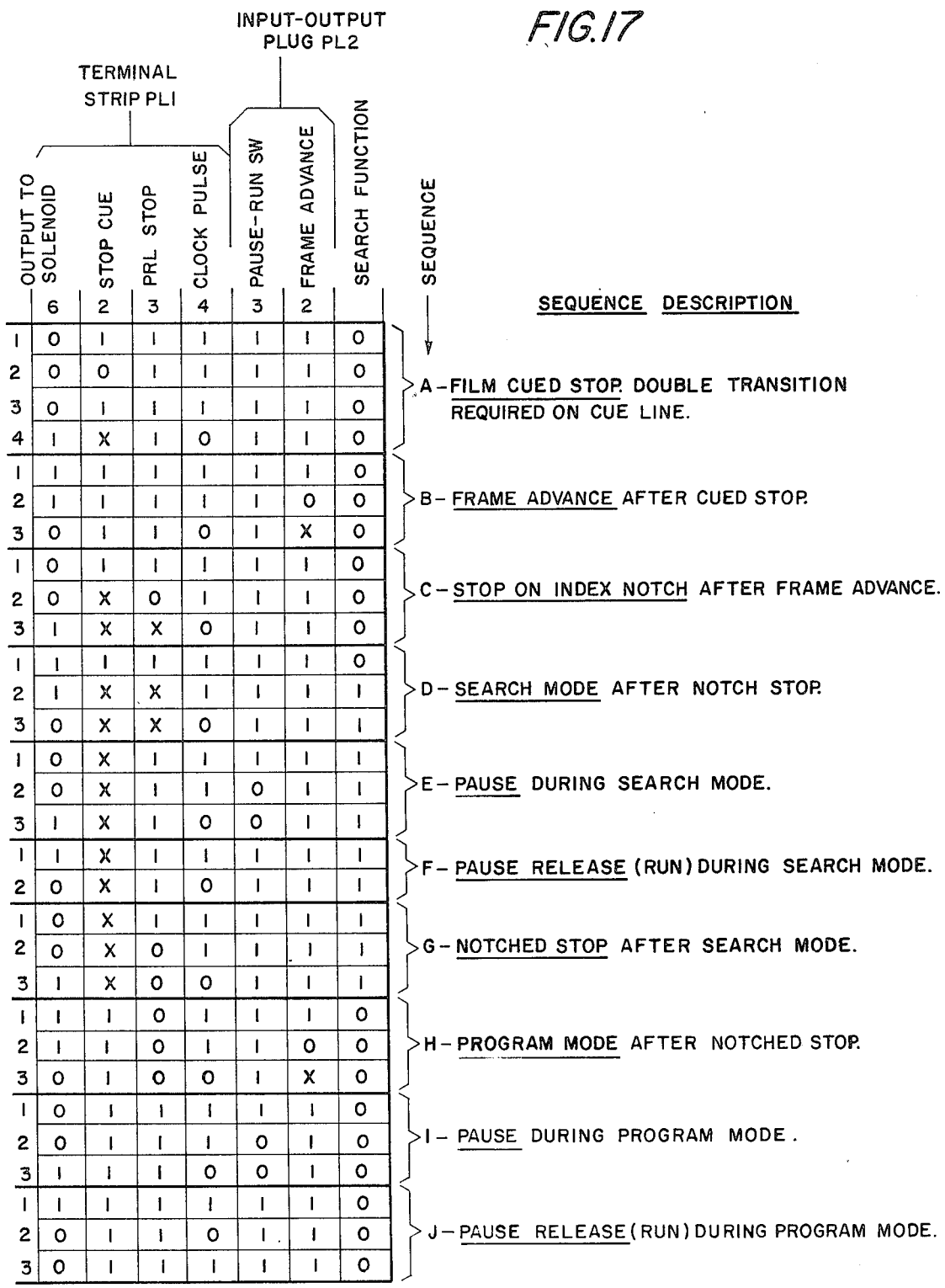

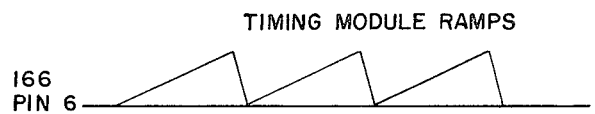
FIG. 18
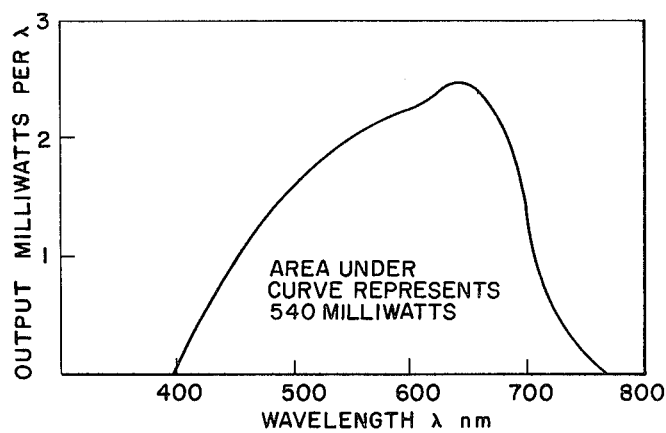
FIG. 19
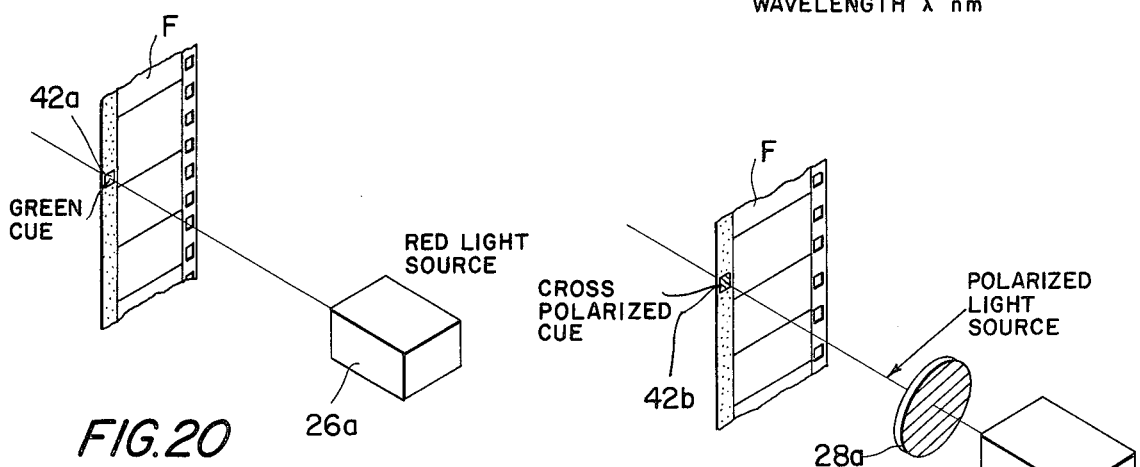
FIG. 20
FIG. 21
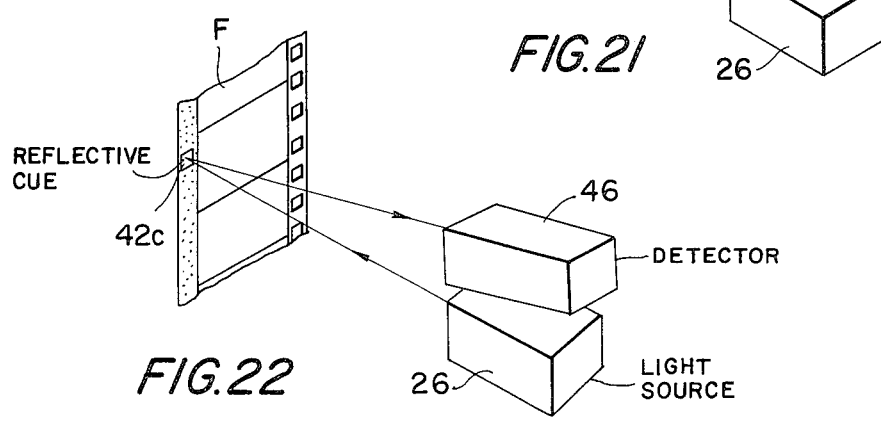
FIG. 22

AUDIO-VISUAL SYSTEMS AND METHODS

BACKGROUND OF THE INVENTION

This invention is concerned with audio-visual systems and methods, particularly of the type employing a motion picture film projector in conjunction with a magnetic tape player.

The prior art is replete with audio-visual systems employing different combinations of visual and audio media, the media being provided separately or integrally. For example, the visual medium may be a motion picture film or slides and the audio medium may be a magnetic tape or a mechanically reproduced disc record. Motion picture films having integral optical or magnetic sound tracks are well known. The integrated audio-visual media are expensive, however, and lack the versatility of separate media.

A vast library of commercial and educational silent motion picture films, much of it contained in endless loop film cartridges, has been established over many years. The desirability of improving or updating that library by providing a suitable audio program accompaniment has long been recognized. Accordingly, it has been proposed to operate a silent motion picture film projector in synchronism with an audio reproducer, such as a magnetic tape player. In order to provide proper synchronization between the projector and the player, it has been proposed to provide a synchronization mark such as an optical cue or a notch adjacent each frame of the film, and also to provide audio cue tones on the sound medium.

The prior art has recognized that the audio and visual media need not move at the same rate throughout a program, and that greater economy, versatility, and entertainment value are possible if the media are "programmed" so as to move at different rates from time to time. For example, the conserve film the film may be stopped during a program so as to project a single frame for a given length of time while the audio portion of the program proceeds. For special effects the film may be advanced at a rate less than (or greater than) the usual free running rate. Nevertheless, the rates of film advancement and audio medium advancement during a program must be predetermined throughout the program if the program is to be reproduced in the same manner time after time and if desired synchronization between audio and visual parts of the program is to be maintained. In the accomplishment of this and other purposes, the art has proposed many types of cueing schemes.

In one prior cueing scheme, cues on the film start the operation of a tape player, and cues on the tape then start and stop the projector. In another, the tape is started by a cue on the film and is stopped by a cue on the tape. In still another scheme, the rate of film advance is controlled by different signals recorded on the tape. In another, the projector is controlled by combinations of coded markings on the film. In yet another scheme, successive cues recorded on the tape control the frame-by-frame advancement of the film at different rates, the film being advanced one frame for each cue on the tape. In addition, a notch provided on the film permits slewing advancement of the film to locate the beginning of a program.

In general, the prior art cueing schemes and the audio-visual systems that employ them suffer from one or more of the following deficiencies: high cost, poor performance, poor reliability, lack of versatility, deterioration of performance and reliability with age, impossibility or impracticality of application to existing silent film libraries, inability to project film in a silient mode if the tape player is absent or malfunctioning, inability to tolerate the loss or improper detection of cues, inability to tolerate the loss of one or more film frames, and problems in programming, editing, splicing, and the like.

BRIEF DESCRIPTION OF THE INVENTION

Accordingly, it is a principal object of the present invention to provide improved audio-visual systems and methods which avoid or ameliorate the deficiencies of the prior art.

Another object of the invention is to provide improved motion picture film projection apparatus.

A further object of the invention is to provide an improved motion picture film cartridge.

Another object of the invention is to provide an improved system for controlling the operation of a motion picture projector.

Yet another object of the invention is to provide an improved motion picture film projector in conjunction with a magnetic tape player.

Briefly stated, one embodiment of a system in accordance with the invention includes a motion picture projector having a film advanced therein for projection and a sound reproducer having a recorded sound medium advanced therein for reproduction. Projector stop cues are provided on the film and projector start cues are provided on the sound medium. When a stop is detected, advancement of the film in the projector stops, and when a start cue is detected, advancement of the film in the projector starts.

More specifically, the stop cues comprise optical perturbations of the film at discrete locations spaced along an edge of the film, and the start cues comprise recorded tones at discrete locations of the sound medium, which is preferably a magnetic tape. The film also is provided with mechanically detected index notches to facilitate location of the beginning of a program, and the projector may be controlled so as to search for an index notch while ignoring optical stop cues.

Optical stop cues are preferably detected while the film is moving, a cueing port being critically located relative to a picture aperture and the stop cues being critically located relative to frames to be projected when the film is stopped in order to provide a highly desirable type of dynamic cue detection. Cue length discrimination assists in providing reliable cueing. The same lamp may illuminate both the picture aperture and the cueing aperture. The cue detection system may be light transmissive or light reflective and may employ optical polarization or coloring to enhance cueing reliability. In addition, the system may incorporate a pause-run control, remote controls, and a variable frame rate control with a single-frame advance option.

BRIEF DESCRIPTION OF THE DRAWINGS

The invention will be further described in conjunction with the accompanying drawings, which illustrate preferred and exemplary embodiments, and wherein:

FIG. 1 is a perspective view illustrating major components of a system of the invention;

FIG. 3 is a schematic diagram further illustrating the system of FIG. 2;

FIG. 8 is a fragmentary diagrammatic perspective view illustrating cooperative portions of a projector and film cartridge employed in the invention;

FIG. 9 is a diagrammatic elevation view explanatory of the apparatus shown in FIG. 8;

FIG. 10 is a graphical diagram illustrating a preferred relationship between stop cue acquisition and the motion of a film advancement claw;

FIG. 11 is a fragmentary view illustrating a length of film that has been programmed in accordance with the invention;

FIG. 12 is a fragmentary diagram illustrating the relative timing of film cues and tape cues in accordance with the invention;

FIGS. 13A–13C illustrate the wave forms of signals employed in the invention;

FIG. 14 is a wave form diagram illustrating the operation of stop cue detection apparatus in accordance with the invention;

FIG. 16 is a diagram illustrating an index notch cycle in accordance with the invention;

FIG. 17 is a truth table illustrating different sequences of operation in accordance with the invention;

FIG. 18 is a wave form diagram illustrating the operation of a variable frame rate control in accordance with the invention;

FIG. 19 is a graphical diagram illustrating desired film illumination characteristics in accordance with the invention; and FIGS. 20–22 are fragmentary diagrammatic perspective views illustrating different types of cue detection systems in accordance with the invention.

DETAILED DESCRIPTION OF THE INVENTION

Figure 2:
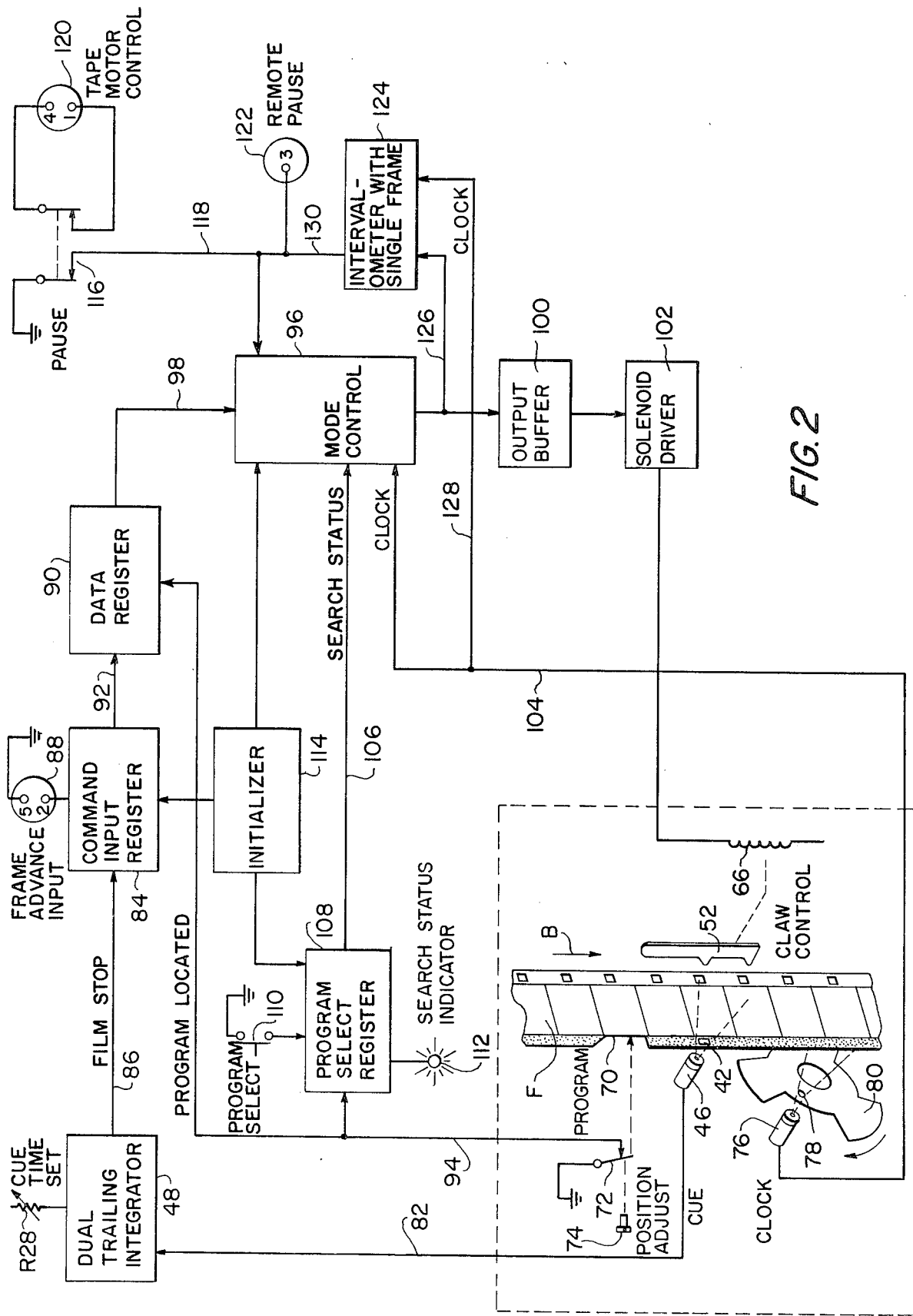
FIG. 2 is a combined block diagram and fragmentary diagrammatic perspective view of a system in accordance with the invention.

Although the principles of the invention have diverse applicability in audio-visual systems, the invention will be described, for purposes of illustration and for presentation of the "best mode", with reference to a system designated as the 920 Superloop Projector System. As shown in FIG. 1, this system comprises a motion picture film projector 10 and a magnetic tape player 12, together with cooperating motion picture film cartridges 14 and magnetic tape cassettes 16. The projector 10 may be a modification of the basic Superloop Projector manufactured and sold by Technicolor Audio-Visual Systems, Costa Mesa, Calif., and the film cartridge 14 a modification of the standard Super 8 mm film cartridge employed with that projector and also manufactured and sold by Technicolor. Basic projector and film cartridge types which may be employed in the invention (but not incorporating the features of the invention to be described hereinafter) are shown and described in U.S. Pat. Nos. 3,139,789; 3,206,757; 3,244,471 and 3,397,937, all assigned to Technicolor and incorporated herein by reference. The tape player 12 may be of a standard type (driven by a DC motor at 1⅞ ips, for example) for reproducing a main audio track and a control track of a standard dual-track magnetic tape cassette 16. As shown in FIG. 1, projector 10 and tape player 12 are interconnected by a cable 18 for cooperative operation in accordance with the invention in a manner which will be described hereinafter. Alternatively the projector and tape player may have a common housing.

In the Superloop system of the invention, the film cartridge 14 contains an endless loop of Super 8 mm motion picture film fed from a roll past an opening 20 at the front of the cartridge and then back to the roll. The cartridge is inserted into a slot in the back of the projector so that the film F passing the opening 20 is oriented vertically as shown in FIG. 8. The film at opening 20 is backed up by a spring-biased pressure plate 22. When the film cartridge is inserted in the projector, the film is interposed between the pressure plate 22 and an aperture plate 24 forming part of the projector. Light from a standard projection lamp 26 of the projector passes through infra-red rejecting filters 28 to a 30-degree cold mirror 30, and then the infra-red deficient light is reflected in the direction of the film. As is well known, the mirror may be inserted automatically in a recess of the film cartridge 14 when the cartridge is inserted in the projector 10, so as to position the mirror for reflecting light from the projection lamp to the film.

Pressure plate 22 of the film cartridge 14 has a rectangular picture aperture 32 which is aligned with a corresponding picture aperture 34 of aperture plate 24 of the projector when the film cartridge is inserted in the projector. Frames of the film are individually aligned with apertures 32 and 34 and are projected on a suitable viewing surface (not shown) when illuminated by the projection lamp 26. The infra-red in the illuminating beam that is not rejected by filters 28 is mostly directed along the path indicated by arrow A, because the mirror 30 transmits rather than reflecting the infra-red.

Pressure plate 22 is provided with a cueing port 36, and aperture plate 24 has a corresponding aligned cueing port 38. The cueing ports are preferably illuminated by light from the same projection lamp 26 that illuminates the film at the picture apertures. The film has a series of sprocket holes 40 along one longitudinal edge, and is provided with optical stop cues 42 along the other edge. A film advancement mechanism of the projector, which in the illustrative system includes a film claw, engages the sprocket holes 40 and advances the film intermittently in the direction of arrow B. Slot 44 in pressure plate 22 is provided to accommodate the film claw. The passing of a cue 42 by the aligned cueing ports 36 and 38 is sensed by a cue detector, including a photo-sensitive optical transducer 46 which produces an output to a duel trailing integrator 48 to be described more fully hereinafter.

In FIG. 9, the field of the projected visible light from lamp 26 is indicated by the circle C. It is seen that the cueing port 36 is located in a peripheral portion of the illumination field, which also includes the picture aperture 32. A film cue 42 is shown in the area 50 of the film F which would normally be occupied by a sound track of a sound film. In accordance with the invention, the optical film cues 42 are employed to stop the advancement of film in the projector. Stop cue 42 shown in FIG. 9 is employed to stop the film with the shaded frame f in alignment with picture aperture 32. It is apparent from the geometry of FIG. 9 that the cue 42 will pass the cueing port 36 and move to the dash line position before the shaded frame f is aligned with the picture aperture 32, and this relationship will be described more fully later.

The stop cues 42 on the film are preferably optical perturbations such as rectangular areas at discrete spaced locations along a longitudinal edge of the film. The cue detection system is preferably a dynamic detection system, as will be described, although under appropriate circumstances a static system could be employed (but not with all the advantages of a dynamic system). The cue detection system may be a light transmissive or a reflective system, a transmissive system being illustrated in FIG. 8. Because it is preferred to use standard dye-emulsion film, and because such film is transmissive to infra-red, it is important to eliminate as much infra-red as possible, as described above, and also to tailor the light spectrum from the projection lamp, not only to reduce the heat to which the film is subjected, but in addition to improve the signal-to-noise ratio in the cue detection system. This problem could, of course, be avoided by the use of more expensive re-developed silver film. FIG. 19 illustrates a preferred energy output-wavelength curve for an illumination system employed in a transmissive cue detection system of the type described above.

In a transmissive cueing system, the cues may be either transparent or opaque. In a typical transparent cue format, the cues may be about 0.05 inch long and have a maximum base and fog density of 0.15, and the sound track region may have a minimum density of 2.0. In an opaque cue format, the cues may be about ⅛ inch long and have a minimum density of 2.0, and the sound track area may have a maximum base and fog density of 0.15. Although either format may be used, for purposes of illustration a simple transparent cue format will be assumed in the system description which follows later. Before that system is described in detail, however, reference will be made to FIGS. 20-22 for alternative types of cueing systems which may be employed.

In FIG. 20 the cues 42a, rather than being opaque to the eye, are colored as one of a pair of complementary colors, the other color of the pair being assigned to the light source 26a. For example, the cues may be green and the light may be red to render the cue "opaque" to the cue sensor. Lime green cues and magenta light are an excellent combination. Usually the cue color will be the one of the pair of colors having the greater transmissivity. Complementary light sources may be derived from the primary illumination source by a system of light filters, or secondary light sources with or without light filters may be used. The intrinsic quality of color in a cue allows an improved signal-to-noise ratio to be developed. Instead of "opaque" cues, transparent cues may be used, with the background sound track area rendered "opaque" by the use of complementary colors as just described.

FIG. 21 illustrates a system employing a polarized light flux at the cueing port in combination with selectively polarized cueing areas on the film, which together produce "opaque" cue areas 42b for sensing by cue detectors. Polarization of the main projection light may be accomplished with a polarizing disc 28a in place of or in combination with the infra-red filters. This requires non-polarized film base material, or film base polarization oriented appropriately relative to the light flux. Alternatively, a small polarizer may be inserted in the cueing port light path between the raw light source and the film or between the film and the cueing sensor. Polarized light provides an appropriate way to identify appropriately polarized cues in an environment of dirt, foreign material and minor film damage and improves the signal-to-noise ratio. Instead of employing "opaque" cues, transparent cues may be used, with the background sound track area rendered "opaque" by the polarization techniques just described.

FIG. 22 illustrates a reflective cue system. Here the light source 26 and the cue detector 46 are located at the same side of the film, and the cues 42c are formed of reflective material, as by providing appropriate metallized areas. Either the cues or the background sound track area may be reflective (the other being relatively non-reflective).

As noted above, the preferred system of the invention employs film stop cues that are detected dynamically. The cues are positioned in very specific locations on the film and their size is closely controlled. In a dynamic system, the position of the cueing port and the position of the cue on the film determine the velocity of the cues at acquisition time. The cueing port position also determines the flux density range of the light in the cueing sensor, assuming that the cueing port is illuminated by the main projector lamp as described above. The length of the cue determines the cue trailing edge acquisition velocity by the cue detector and the parameters of cue length discrimination, which is desirable to provide reliable cueing.

As shown in FIG. 9, the cueing port 36 is preferably located about 1⅓ film frame lengths in advance of the transverse center line of the picture aperture 32 (in terms of film movement toward the picture aperture). Each transparent stop cue 42 is preferably located adjacent to the frame next succeeding the frame to be viewed when the film is stopped in response to detection of the stop cue, preferably adjacent to the first third or first half of the succeeding frame. If opaque cues are used they are preferably located adjacent to the trailing half of the frame to be projected and may extend about 0.025 inch beyond the leading edge of the succeeding frame.

As also noted previously, the film advancement mechanism of the projector is preferably of the intermittent type employing a sprocket-hole-engaging claw. In the illustrative system the claw engages the sprocket holes, then moves downwardly to advance the film by one frame, and then moves upwardly to its starting point, ratcheting past the sprocket holes. The film is first accelerated by the claw from zero velocity to a maximum velocity, then decelerated again to zero velocity. FIG. 10 is a graphical diagram illustrating claw velocity, acceleration, and displacement versus time and lift angle of the cam which drives the claw. Cue acquisition by the cue detector preferably occurs during the initial half of the frame shift cycle on the ascent of the velocity profile, so that the cue trailing edge (b) is acquired at about twice the velocity of the leading edge (a). This minimizes the effect of cue aging, since it has been found that the deterioration of the cue is greatest at the trailing edge.

Figure 4:
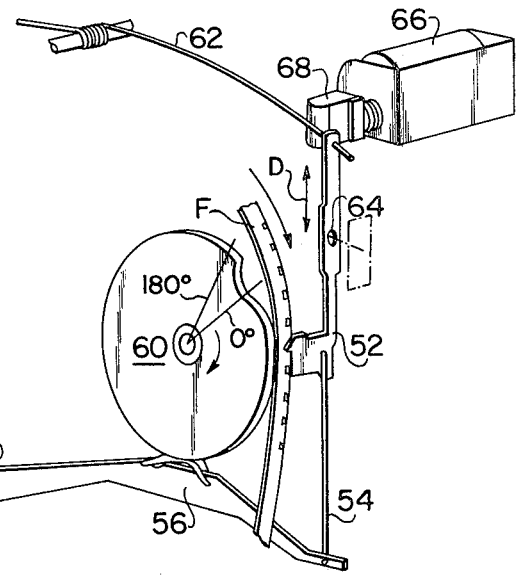
FIG. 4 is a perspective view illustrating a film advance mechanism which may be employed in the invention.
Figure 5:
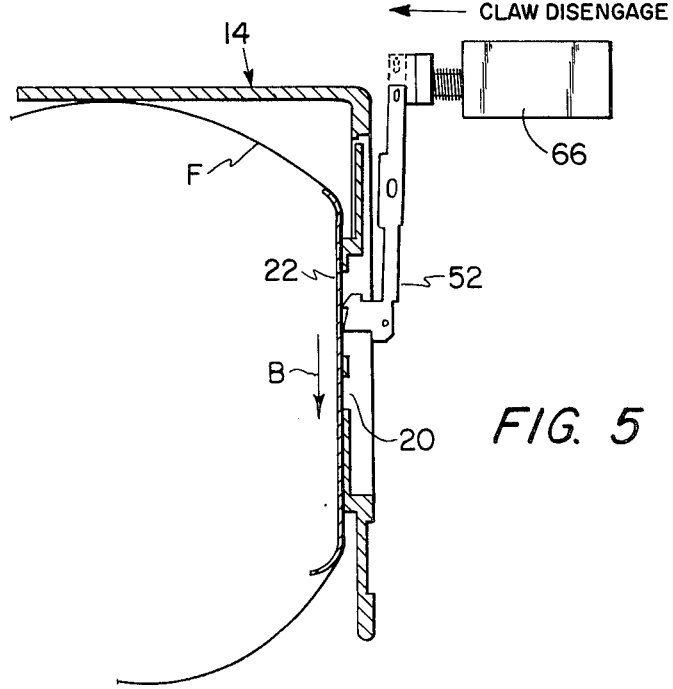
FIG. 5 is a partly sectional side elevation view of the mechanism of FIG. 4.

A typical claw drive mechanism is illustrated in FIGS. 4 and 5 (the position of the film being distorted in FIG. 4, for illustration). The claw 52 is pulled downwardly by a link 54 connected to the end of an arm 56 pivoted on a frame (not shown) at 58 and driven by a rotating cam 60 (the shape of which is exaggerated for illustration). A return spring 62 moves the claw upwardly when the cam permits. The claw is pivoted at 64 upon a member which reciprocates in a guide (as indicated in phantom lines) in the direction of arrow D. The 180° half sine wave lift angle in FIG. 10 corresponds to 60° of cam rotation as indicated in FIG. 4. In the system of the invention, a claw-control solenoid 66 has a toggle armature 68 which is extended from the solenoid to engage the upper end of the claw when the solenoid is de-energized, turning the claw about the pivot 64 and preventing engagement of the claw teeth with the film even though the claw continues to move up and down cyclically.

Referring now to the system block diagram of FIG. 2, the film F, in addition to having optical stop cues 42, is provided with program reference elements, preferably in the form of index notches 70 formed in the same longitudinal edge region of the film as the optical stop cues 42. The index notches are sensed by the actuator arm of a program reference locator switch (PRL switch) 72, which may be a microswitch mounted in the projector and having an actuator arm positioned for alignment with the index notches 70. The position of the actuator arm may be adjusted by an adjustment screw 74. The pressure plate 22 (FIG. 8) has a slot 75 to receive the tip of the PRL switch actuator arm. Additional slots (not shown) along one edge of the pressure plate receive fixed film guides, and a further slot (not shown) aligned with slot 75 along the opposite edge receives a spring (not shown) which, together with the spring bias of the actuator arm, positions the film relative to the fixed guides in a known manner. The purpose of the index notches is to permit the rapid location of the beginning of a program or film sequence.

For timing purposes in the system illustrated, and particularly to insure properly timed engagement and disengagement of the claw 52 with the film F under the control of the solenoid 66, a clocking system is provided. In the form shown, clock pulses are produced by a photo-sensitive transducer 76 which receives light from a hole (or slot) 78 in the projector shutter 80 from the projector lamp previously described. (In practice, claw 52 is on the same side of the film as the shutter.) Each time the shutter turns through one complete shutter cycle, a clock pulse is produced from transducer 76, the position of hole 78 being chosen to provide the desired lead time. FIG. 13C illustrates a typical clock pulse.

Film stop cue pulses (a typical pulse being illustrated in FIG. 13A) are supplied to the dual trailing integrator 48 from transducer 46 via conductor 82. In response to each stop cue, the dual trailing integrator 48 provides a film stop signal to a command input register 84 via conductor 86. Cue length discrimination is adjusted by means of variable resistor R28.

The command input register 84 stores film stop commands supplied via conductor 86 or frame advance commands from a frame advance input 88. At the same time that the command input register 84 is set, a data register 90 is set via conductor 92. The data register is employed in starting programs and receives signals from PRL switch 72 via conductor 94.

The output of the data register 90 supplies a signal to a mode control 96 via conductor 98. The mode control determines whether the film is advanced ("run" mode) or stopped ("stop" mode). Its output is supplied to an output buffer 100 and then to a solenoid driver 102 which drives the claw control solenoid 66. Clock pulses are supplied to the mode control 96 via conductor 104. A search status input to the mode control is supplied via conductor 106 from a program select register 108. The program select register receives a signal from PRL switch 72 via conductor 94 and has an associated program select switch 110 and a search status indicator 112.

When the program select switch 110 is closed, the program select register 108 supplies a search status signal to the mode control 96 via conductor 106, causing the film to be advanced until a Program Reference Locator Notch 70 is detected by the PRL switch 72, whereupon film advancement stops. During the search for the PRL notch, the search status indicator 112 is energized. An initializer 114 connected to the command input register 84, the mode control 96, and the program select register 108, ensures that the system operates in a search mode, seeking a PRL notch 70, when power is first applied to the system, assuming, of course, that the PRL switch 72 does not already detect a notch 70 at that time. The initializer also retains the existing operating mode for at least 300 ms to avoid interruptions due to line voltage changes.

A pause switch 116 is connected to mode control 96 via conductor 118 and is used to stop advancement of both the film and the magnetic tape. A tape motor control output is shown at 120, and a remote pause input at 122.

Also illustrated in FIG. 2 is an intervalometer 124 with a single frame advancement feature. The intervalometer is employed to provide variable film advancement rates, and the single frame advancement feature provides advancement of a single film frame each time a control is operated. The intervalometer receives an input from the mode control via conductor 126 and receives clocks via conductor 128. An output is supplied to the mode control via conductor 130.

Figure 6:
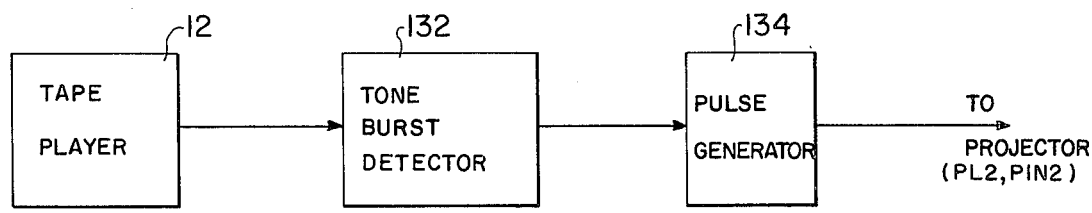
FIG. 6 is a block diagram of an audio portion of a system.

Before the system of FIG. 2 is described in greater detail, with reference to FIG. 3, it is appropriate to consider the audio portion of the system and the relationship of the audio and visual portions of the programs. As noted previously, start cues to start film advancement in the projector are supplied from the audio medium. In the preferred system, the start cues are provided as 1000 Hz tone bursts on a control track of the magnetic tape in the cassette 16. As shown in FIG. 6, the tape player 12 has a tone burst detector 132 which triggers a pulse generator 134 to produce a start cue pulse in response to each 1000 Hz tone burst. A typical frame advance pulse produced by the pulse generator 134 is shown in FIG. 13B. The tone burst detector 132 and the pulse generator 134 may, of course, be incorporated in the tape player. Such tape players are well known in the art.

Because there are operating tolerances associated with the recording, playback and projector speeds, an allowance for these tolerances must be designed into any program which utilizes full speed (18 frames per second) operation. This allowance, or frame advance delay, assures that the projector shall reach a planned stop cue on film before the tape player transmits a corresponding frame advance command to the projector, thus maintaining program synchronization. This allowance, expressed as a time delay, is derived by changing the nominal frame-to-frame time of 0.055 seconds to a factor of 0.0630 seconds. For instance, if it is desired to run the film F at full speed for ten seconds prior to a cued stop, the film will have a stop cue 180 frames (10×18) from the first, or preceeding stop cue. The frame advance tone burst, however, shall be recorded on the tape program a minimum of 11.34 seconds (0.0630×180) after the preceeding (or mode-initiating) frame advance tone burst.

Thus it can be seen that the projector can conceivably reach the stop cue 1.34 seconds before the playback unit can transmit a mode-changing frame advance command. On the other hand, there may be very little delay. The frame-to-frame time factor of 0.0630 seconds is an allowance that slightly exceeds the widest possible range of speed differentials and is, in most instances, excessive. Using it, however, insures that all programs will correctly function in different machines. A speed differential between tape player and film projector of up to 12% is normally allowed.

When a program is initially planned, it is desirable to locate the film splice which closes the loop of film in a non-programmed, opaque length of film between the tail of a program and the head (see FIG. 12). This is done in order to preclude the possibility of seeing the splice (or resultant image unsteadiness) as it passes through the picture aperture. If the tail of the film has an "end" cue, for instance, and the splice is located between it and an index notch on opaque film, the splice will pass through the aperture without being seen on the screen when the projector is turned on again. The projector will have gone into the search mode and pulled the opaque film and the splice across the aperture prior to any programmed viewing.

When the projector senses the program index notch 70 at the beginning of a program or program sequence, it will stop film transport and project frame no.1 of the program as designated in FIG. 11. A frame advance command from the tape will move frame no. 6 onto the picture aperture. This frame may be part of the program, but in the event it is not desired to use frame 6 in a still-frame mode, a second frame advance pulse 0.5 seconds after the first frame advance pulse will cause the projector to proceed at nearly full speed motion through the notch.

Having stopped at an index notch, the projector requires one frame advance command in order to resume film transport and a further frame advance command to pass the index notch by the stop cue sensor. Since the edges of the index notch may become dirty with age, additional commands 0.5 seconds apart may be required to assure reliable operation.

An option available to the programmer, end-cue starting, allows a program to be repeated without stopping the projector or pressing the program select switch. In other words, the tape can begin a program from a program end cue as well as from a program index notch. If a program has been run through, for instance, the projector will be running, but not transporting film because it will have stopped on the last film cue or "end" cue. If the tape cassette is then rewound to the beginning, it would be possible to begin the program a gain without having to turn the projector off and then on again or to depress the program select switch in order to make the projector search for an index notch. Since a program which includes end-cue starting must also provide for index notch starting, a certain amount of program complexity is required, but this is not difficult to implement. The complexity is caused by the amount of time or the number of frames between the end cue and the index notch and the amount of time to pass through the index notch without hesitation. This time must be allowed for during normal starting (index notch starts).

FIG. 12 is illustrative of the timing relationship between the start cues S1, S2, etc., of the tape T, and stop cues 42 and an index notch 70 on the film. For purposes of illustration, the film region illustrated is the region at which a splice is provided to join the head to the tail of the continuous film loop. Shown on the film are the last program stop cue (that is, the last stop cue within the program), the end stop cue (at which the film stops when the program is finished), an index notch 70 for locating the beginning of the program, and the first stop cue within the program. The direction of film movement is indicated by arrow B, and the tape movement direction by arrow E. Just below the film in FIG. 12 is shown a length of tape at the end of the tape program. The last start cue (so designated) starts the advancement of the film after it has stopped on the last program stop cue (so designated). For an end-cue start, the sequence shown by the length of tape designated "end-cue start" may be employed when the tape has been rewound. The first frame advance start cue S1 allows the projector to transport film until the index notch 70 is sensed. Start cue S2 is a redundant cue employed for certainty of advance. When the index notch 70 is detected, start cues S3 and S4 allow the projector to pass through the notch with a minimum delay. Start cue S5 is a redundant cue. The amount of time required to go through the end cue to the notch, both on the film and the tape, must be added to the beginning of the program for normal starts. On normal starts, illustrated by a length of tape so designated, start cues S1 and S2 move the projector through the index notch. Having moved through the notch, both the film and the tape must run until start cues S3 and S4 have been passed before programming can occur.

FIG. 3 illustrates the system of FIG. 2 in greater detail. The transducers 46 and 76 may be phototansistors, which, with the PRL switch 72, are part of a sensor block that also includes the claw control solenoid 66. Outputs from the sensor block are taken from a terminal strip PL1.

The dual trailing integrator 48 includes three NAND gates 136, 138, and 140. The command input register 84 comprises a D-type flip-flop 142. The data register 90 includes a D-type flip-flop 144. Another such flip-flop, 146, is employed in the program select register 108. The mode control 96 includes three NAND gates, 148, 150, and 152, and a further D-type flip-flop 154. The output buffer 100 comprises NAND gates 156 and 158. The solenoid driver 102 comprises a transistor 160 and a pair of diodes 162 and 164. The elements of the initializer 114 are shown somewhat distributed in FIG. 3, but include the resistors R14, R9, and R26, and capacitors C5, and C11. Plug PL2 comprises the frame advance input 88, the tape motor control 120, and the remote pause 122 shown distributed in FIG. 2.

The intervalometer 124 (including the single frame feature) comprises a standard timing module 166, NAND gates 168, 170, and 172, switches 174 and 176 and socket PL101 for remote control. Also shown in FIG. 3 are the pause switch 116, and on-off switch 178, a conventional power supply 180, a motor transformer 182 for energizing the projector motor, and the projection lamp 26. Negative-going positive logic is assumed.

Thus the rest state is a logical one, and a logical zero is represented by a negative pulse.

For purposes of illustration, the NAND gates in FIG. 3 may be elements designated U1, U3, and U101 of type N7400 chips, while the D-type flip-flops may be elements designated U2 and U4 of N7474A chips. The timing module 166 (U102) may be a type NE555V. Pin numbers are shown adjacent to the foregoing components. For the timing module, pin 1 is at ground potential and pin 8 is at 5.1 volts. For the NAND gates and the D-type flip-flops, pin 7 is at ground potential and pin 14 at 5.1 volts. In the following parts list, appropriate illustrative values and component types are given, it being understood that the invention is in no respect limited in this regard. All capacitor values are microfarads and all resistor values ohms.

| Ref. No. | Type or Value | Ref. No. | Type or Value |
| --- | --- | --- | --- |
| 160 | 2N5295 | R25 | 75 |
| 46 | OP-7519-3 | R26 | 6.8K |
| 76 | OP-7519-3 | R27 | 4.7K |
| 112 | MV5054-2 | R28 | 500 |
| 162 | IN4001 | R29 | 5.6K |
| 164 | IN4001 | R30 | 9.1K |
| U5 | SBR102 | R31 | 150 |
| CR3 | IN4733A | R101 | 330 |
| CR101 | IN4001 | R102 | 9.1K |
| R1 | 3.6K | R103 | 9.1K |
| R2 | 100 | R104 | 9.1K |
| R3 | 9.1K | R105 | 150 |
| R4 | 27K | R106 | 22K |
| R5 | 9.1K | R107 | 9.1K |
| R6 | 3.6K | R108 | 150K |
| R7 | 9.1K | R109 | 2.2K |
| R8 | 2.7K | C1 | .05 |
| R9 | 4.7K | C2 | .33 |
| R10 | 4.7K | C3 | .1 |
| R11 | 27K | C4 | .68 |
| R12 | 4.7K | C5 | 0.5 |
| R13 | 75 | C6 | 2.2 |
| R14 | 9.1K | C7 | 150 |
| R15 | 3.6K | C8 | 2200 |
| R16 | 9.1K | C9 | .1 |
| R17 | 9.1K | C10 | 1000 |
| R18 | 9.1K | C11 | .05 |
| R19 | 4.7K | C12 | 10 |
| R20 | 56 | C101 | .33 |
| R21 | 2.2K | C102 | .1 |
| R22 | 10 | C103 | .1 |
| R23 | 15 | C104 | 50 |
| R24 | 100 | C105 | .0033 |

FIG. 14 illustrates the operation of the dual trailing integrator 48. Line (A) illustrates stop cue pulses of different lengths on the stop cue input line 82. Lines (B) and (D) illustrate the integration curves, and lines (C) and (E) illustrate output pulses for different adjustments of the integrator. The numbers on the integration curves of lines (B) and (D) represent the potentials at pins 4 and 5 of NAND gate 140, while the output pulses of lines (C) and (E) represent the potential at pin 6 of that NAND gate. The integrator is a differential type requiring two state changes for input recognition.

The time of the output pulse of the integrator depends upon the exponential decay of two integrator sections, a fixed section and a variable section. The leading edge of the output pulse coincides with the instant both section outputs are in a high state. The trailing edge results when either section output falls to a low logic state. Resistor R28 sets the threshold for cue length detection, and the integrator will ignore cues of lesser length and recognize all cues of greater length. Variations in optical cue amplitude have little effect on the integrator operation. The output at pin 6 is time dependent on the input pulse length for both leading and trailing edges. The time constant for the fixed integrator must be much less than that for the variable integrator for any threshold setting, because the leading edge on pin no. 5 must reach logic zero before pin no. 4 rises above 1.2 volts (assuming usual TTL amplitude requirements). A ratio of 20:1 or greater will insure proper operation. In the example, resistor R28 may be set to produce output pulses in line (C) for only two of the stop cue pulses of line (A) or may be set to produce output pulses for all three, as indicated in line (E). Cue length discrimination is effective in providing reliable cueing, even when the film cues have aged or when dirt or other spurious marks are present.

The operation of the system of FIG. 3 may now be examined. Each time a film stop cue 42 is detected by transducer 46, an output pulse is produced at pin 6 of NAND gate 140 of the dual trailing integrator 48. This pulse is applied to the PR terminal 10 of flip-flop 142 of the command input register 84, setting this flip-flop, and also setting the data register flip-flop 144 via the connection from the Q output terminal of flip-flop 142 to the C input terminal of flip-flop 144. The output from the Q terminal of flip-flop 144 is applied via NAND gates 148 and 152 to the D terminal of flip-flop 154 of the mode control, and this flip-flop is set by the leading edge of the next clock pulse applied to the C terminal of the flip-flop via NAND gate 150. The output at the Q terminal of flip-flop 154 is applied to the output buffer 100 so that the solenoid driver 102 turns off transistor 160. This causes the potential at pin 6 of terminal strip PL1 to go high, de-energizing solenoid 66 just before the next pull-down stroke of claw 52 and stopping the advancement of film with the desired frame aligned with the picture aperture. The film will remain stationary, so that a single frame is projected, until a film advance signal is applied, such as a start cue signal from tape.

A start cue signal from tape (or an external switch) is applied to pin 2 of plug PL2. This signal, in the form of a negative pulse, is applied to the CR input terminal 13 of flip-flop 142 of the command input register 84, resetting the flip-flop. The data register flip-flop 144 is accordingly reset also, and when the next clock pulse appears at pin 4 of terminal strip PL1, the mode control flip-flop 154 is reset, turning on solenoid driver transistor 160 and energizing solenoid 66. The film claw 52, which has been moving cyclically while the film is stopped, but out of engagement with the film, is now permitted to move toward the film just as it is prepared for its next pull-down stroke, engaging the film and advancing the film again frame by frame.

Whenever PRL switch 72 senses a PRL notch in the film, pin 3 of terminal strip PL1 is grounded. The D terminal of program select register flip-flop 146 is thus at a low potential, which is passed to the Q terminal, so that the search status indicator 112 is de-energized. When power is first applied to the system, the initializer assures that the mode control enters a search mode, so that the film is repetitively advanced by the film claw, regardless of the detection of stop cues, until a program reference locator notch 70 is detected by the PRL switch 72. Initially all registers are set in a "stop" status, except the program select register, which is set in a "search" status. When the notch is located, the solenoid is de-energized so as to stop the film in response to the next clock pulse, with the frame representing the beginning of the program aligned with the picture aperture. Pressing the program select switch 110 similarly forces a search mode until a PRL notch is located. FIG. 16 illustrates a PRL index cycle. Since in the illustrative form, the index notch is more than one frame in length, two clock pulses (and two start cues) are required for a complete logic transition.

Figure 15:
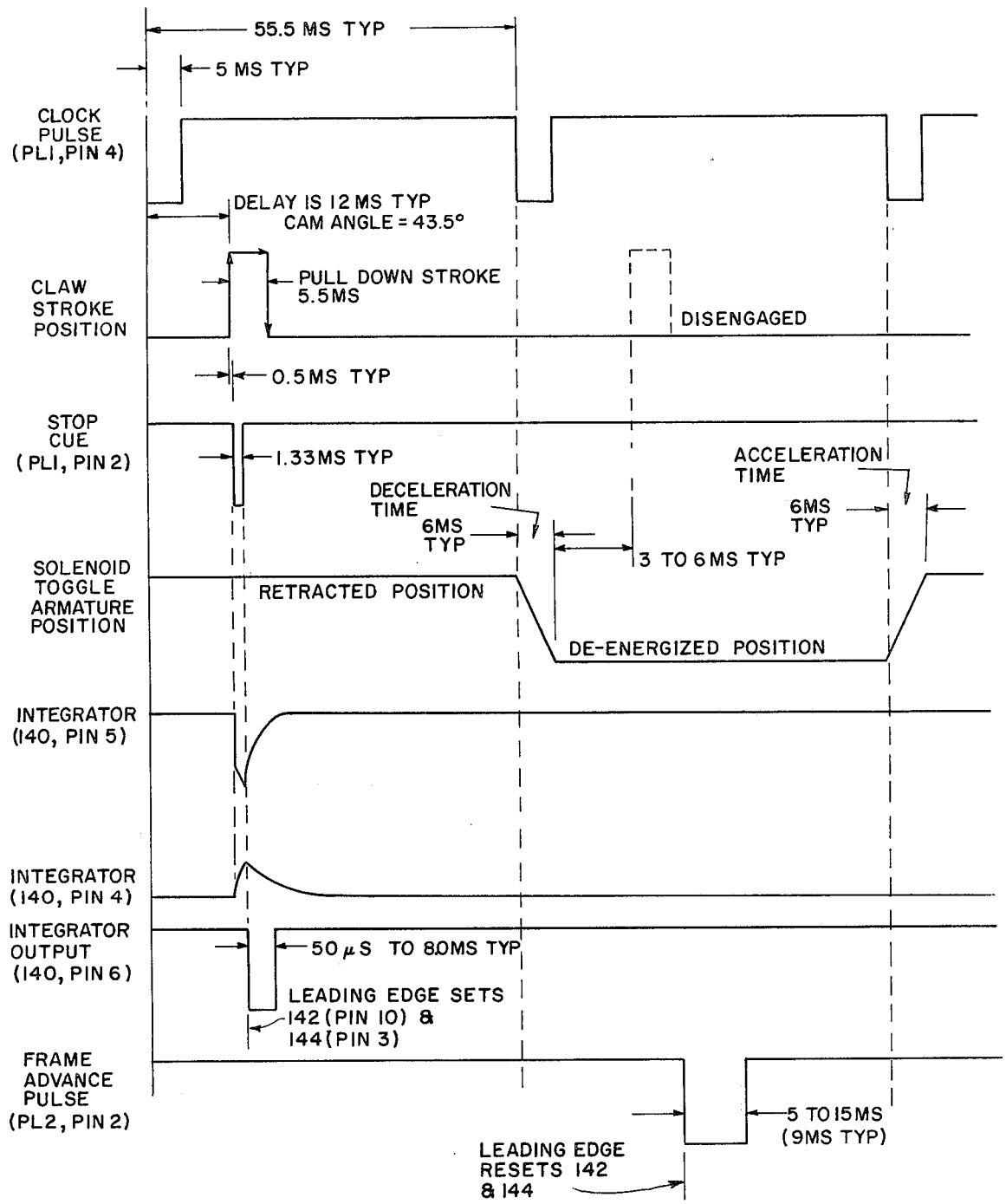
FIG. 15 is a diagram illustrating the timing relationship of certain operations and signals in accordance with the invention.

FIG. 15 is a timing diagram illustrating the operation of the system in response to a stop cue and then a start cue (frame advance pulse).

The pause switch 116 may be employed to stop both the film and tape movement. When the pause switch is thrown to the right in FIG. 3, conductor 118 is switched to a low logic level, causing the mode control 96 to stop the advancement of film when the next clock pulse is produced. When the switch is returned to the left in FIG. 3, film advancement starts again upon the next clock pulse. The tape player motor is de-energized and energized concurrently with the stopping and starting of the film movement, since switch 116 opens and closes a circuit between pins 1 and 4 of plug PL2 that is required for energization of the player motor. The tape player is normally disconnected or de-energized when the system is in a "search" mode but once the tape player is energized, at the beginning of a program, it runs continuously until the end of the tape unless the pause switch is actuated.

Figure 7:
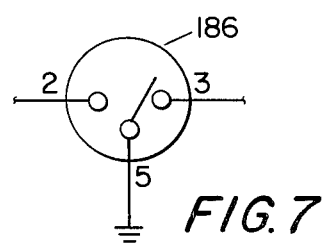
FIG. 7 is a diagrammatic view of a remote control switch which may be employed in the invention.

A remote control switch 186 (FIG. 7) may be employed to start and stop the film movement manually so that programmed film may be reviewed without the need for a tape player. The switch terminals are connected to the corresponding terminals of plug PL2. Actuation of the switch connects pins 5 and 3 of plug PL2, grounding conductor 118 in the same manner as pause switch 116. When switch 186 is released, it connects pins 2 and 5 of plug PL2, grounding conductor 188 and applying a restart signal to the command input register.

FIG. 17 is a truth table illustrating different sequences of operation, and is helpful to a comprehensive understanding of the system of FIG. 3. In the table, search function "0" denotes "program" mode and search function "1" denotes "search" mode. Output to solenoid "0" denotes "run" mode and output "1" denotes "stop" mode. Unless otherwise specified, logic "1" indicates a static voltage level of from 3.60 V to 5.35 V maximum; logic "0" indicates a static voltage level of from zero to 0.5 V maximum; and logic "X" denotes that the logic level is inconsequential at that time.

The intervalometer 124 with the single frame feature is principally intended to provide frame rate control and controlled single-frame advancement without requiring programmed film or a tape player. The intervalometer performs a remote pause function in synchronization with the basic frame rate (which may be assumed to be 18 frames per second for example) changing the interval between frame advances (by skipping claw engagement cycles) and hence changing the average film speed. Timing module 166 is a repetitive ramp generator the repetition rate of which is adjusted by resistor R108. The ramps are shown in FIG. 18. When switch 174 is in its upper position in FIG. 3, the output from the timing module 166 is applied to NAND gate 168 in order to switch conductor 130 to a low logic level repetitively in synchronism with the clocks supplied to the timing module via conductor 128. A negative output pulse appears at pin 3 of module 166 each time a ramp falls. In general, there are several clock pulses for each ramp, one of which (depending on the ramp repetition rate and thus the ramp length) will cause the ramp to fall at a precise instant close to the time when it would fall naturally. During adjustment of resistor R108, different clock pulses will assume control of the timing module as they approach the natural fall time of the ramps so that the ramp repetition rate will tend to vary in steps rather than continuously. Resistor R31 and capacitor C14 form a delay network to prevent a clock from arriving at the mode control register before arriving at the intervalometer. In the single frame mode, switch 174 is moved to its lower position in FIG. 3. Single frame advancement switch 176 controls a flip-flop comprising NAND gates 170 and 172. The flip-flop is set by switch 176 and is reset by a feedback connection from the mode control register 154 via conductor 126. Each time switch 176 is moved upwardly, the flip is set, and on the next clock pulse solenoid 66 is energized via the mode control register 154 to advance the film. The flip-flop is immediately reset via conductor 126, however, so that solenoid 66 is de-energized on the next clock pulse, and the film is advanced by only one frame.

The intervalometer may be employed to provide frame advance rates of from 1 to 18 frames per second, for example, integrally dividing down the basic rate of 18 frames per second to 9, 6, 3, 2, or 1 frame per second. If the intervalometer is used in conjunction with programmed film, the projector will advance film at any preset speed but will otherwise perform in the usual manner.

It is apparent from the foregoing that the invention provides an exceptional audio-visual system. The possible variations in a program are, for all practical purposes, unlimited. One can combine narration with the techniques of filmstrip, slow motion speeds, full speed or selective stop motion at will. In addition, the same film loop can be multiprogrammable, that is, several audio programs can be used with any one loop of film, or similar but multi-linguistic tape programs can be used identically with any given film program. The system also lends itself to programmed learning techniques. If, for example, the length of film required for a program is relatively short, several programs can be included in any one loop of film and the cassette programs switched as required, or the same loop of film can be repeated as successive tape programs review and reemphasize subjects of particular interest.

The stop and advance relationship of the stop cues on the film and the start cues on the tape can be programmed to accomplish slow motion in variations of one, two, three, six and nine frames per second or can be used to simply stop on every frame for narration purposes. Slow motion film advance rates are provided by using different combinations of stop and start cues, so as to skip claw engagement cycles and thereby to vary the average film speed. Full speed (18 frames per second) operation is automatic in the absence of stop cues on the film.

The cue sensing mechanisms of the invention are highly reliable, but if a mechanism should fail, the film cartridges can still be used as regular non-programmed film. The projector will project older, non-programmed cartridges in the conventional manner without requiring the presence or operation of an audio record reproducer or programming controls. Programming of film or tape is a simple matter, and existing film can be readily programmed. The pressure plates of existing cartridges must, however, be modified in accordance with the present invention, and extra cooling is desirable. A special advantage of the invention is its re-sync capability in case of a missed stop cue. By providing stop cues only on the film and start cues ony on the tape, re-synchronization is provided at each stop. Redundant start cues provide start assurance. Re-spliced films will perform as well as new films, and damaged cues or cues removed in splicing are easily restored.

While preferred embodiments of the invention have been shown and described, it will be apparent that changes can be made without departing from the principles of the invention, the scope of which is defined in the following claims. For example, the term "motion picture film" is used not only to designate film which normally would be shown in a motion picture mode, but also strips and the like specifically produced for stop action and other special display modes.

I claim:

1. A projector for advancing and projecting motion picture film having optical stop cues thereon, said projector having a picture aperture and a cueing port and means for illuminating said aperture and said port, the picture aperture being arranged for alignment with successive frames of said film, and the cueing port being arranged to be passed by said cues, the center of said cueing port being located a distance of about one and one third frame lengths from the transverse center line of the picture aperture, means for detecting moving cues passing said cueing port, and means responsive to a detected moving cue for stopping advancement of film in said projector so that a corresponding frame is aligned with the picture aperture.

2. A projector in accordance with claim 1, wherein the film is advanced in said projector by means arranged to engage film sprocket holes at one side of said picture aperture and wherein said cueing port is located at the opposite side of said picture aperture.

3. A projector in accordance with claim 1, said illuminating means comprising a lamp arranged to illuminate both said picture aperture and said cueing port.

4. A projector in accordance with claim 1, wherein said stopping means comprises cue length discriminating means for stopping advancement of said film only when a moving cue of at least a predetermined length is detected.

5. A projector for advancing and projecting motion picture film having successive film frames and having successive optical stop cues thereon, comprising dynamic detecting means for detecting said stop cues successively while they are moving, means for stopping advancement of film in the projector in response to a detected moving stop cue, for projecting a corresponding frame, but only if the cue has at least a predetermined minimum length, and means for starting advancement of the film after it has stopped.

6. A projector in accordance with claim 5, wherein the detecting means detects the leading edge and the trailing edge of each cue and produces an output to stop advancement of the film only when the time interval between detection of the leading and trailing edges of a stop cue is at least a predetermined value.

7. A system comprising a motion picture projector having film drive means for advancing film, a picture aperture and optical means for projecting a film frame aligned with said aperture, a film adapted to be advanced by the film drive means of the projector for projection of successive film frames, a sound reproducer, and a recorded sound medium adapted to be advanced by the sound reproducer for reproduction, the sound reproducer having drive means for advancing the recorded sound medium, the recorded sound medium having film start cues thereon at successive discrete locations, means for detecting each of the film start cues in succession as the recorded sound medium is advanced, the film having film stop cues thereon at successive discrete locations, means for detecting each of the film stop cues in succession as the film is advanced, and control means for the film drive means, the control means being responsive to detection of a film start cue on the recorded sound medium for causing the film drive means to start the advancement of the film and thereafter continue advancement of the film independently of the advancement of the recorded sound medium until a film stop cue is detected, the control means being responsive to detection of a film stop cue on the film for causing the film drive means to stop the advancement of the film with a film frame aligned with the picture aperture and projected by the optical means, the drive means of the sound reproducer operating independently of the film stop cues so that the recorded sound medium continues to advance when the film advancement is stopped, in order that a further film start cue may be detected for starting the advancement of the film again, the control means being responsive to the timing of successive film stop and film start cues for causing the film drive means to produce different film frame rates, so that a film program may be projected including film strip, slow motion speed, full speed, and stop motion projection automatically, together with synchronized sound accompaniment.

8. A system in accordance with claim 7, wherein said film has at least one program index notch in a longitudinal edge thereof and the system comprises means for detecting said notch, said control means being responsive to said notch detecting means for causing the film drive means to stop the advancement of said film in said projector.

9. A system in accordance with claim 8, wherein said control means causes said film drive means to advance film until an index notch is detected, regardless of the detection of stop cues.

10. A system in accordance with claim 7, wherein said film has sprocket holes along one longitudinal edge, and wherein said stop cues are provided along the opposite longitudinal edge.

11. A system in accordance with claim 7, wherein said start cues are redundant tone bursts for corresponding stop cues.

12. A system in accordance with claim 7, wherein said projector has a single projection lamp for illuminating individual frames of said film and individual stop cues and wherein said stop cue detecting means comprises a photo-sensitive detector responsive to illumination of individual stop cues.

13. A system in accordance with claim 7, wherein said film is held in a film cartridge, said projector and said cartridge having aligned picture apertures between which individual frames of said film are aligned for projection and having aligned cue ports between which individual stop cues are passed for detection.

14. A system in accordance with claim 7, wherein said system has a cueing port arranged to be passed by individual stop cues for detection, said port being located in advance of said picture aperture in terms of film advancement toward said picture aperture.

15. A system in accordance with claim 14, wherein the center of said cueing port is separated from the transverse center line of said picture aperture by a distance of about one and a third frame lengths.

16. A system in accordance with claim 14, wherein each stop cue is located adjacent to the leading half of a frame next succeeding the frame to be projected when the film is stopped in response to the detection of that stop cue, and wherein said stop cue detecting means comprises means for detecting stop cues while they are moving.

17. A system in accordance with claim 7, wherein said drive means of said projector has means for advancing said film cyclically, one frame at a time, with the film being accelerated and then decelerated during each frame advancement cycle, and wherein said stop cue detecting means comprises means for detecting stop cues while the film is accelerating.

18. A system in accordance with claim 17, wherein said means for detecting stop cues comprises means for sensing a leading edge of a stop cue, means for sensing a trailing edge of a stop cue, and means for producing an output for stopping the advancement of film only if the sensing of the trailing edge occurs at least a predetermined time interval after the sensing of the leading edge.

19. A film drive system for a motion picture film projector, comprising a film drive mechanism for moving said film, a mode control register for controlling the operation of said drive mechanism, said mode control register having a run mode during which said drive mechanism is permitted to move said film and a stop mode during which said drive mechanism is prevented from moving said film, means for setting said mode control register in its run mode in response to at least one of (a) an initializer, (b) a program select control, and (c) a start signal, and means for setting said mode control register in its stop mode in response to at least one of (i) a stop cue on said film and (ii) a program locator element on said film.

20. A system in accordance with claim 19, wherein the setting of said mode control register is synchronized with the movement of said film.

21. A system in accordance with claim 19, wherein said program select control comprises a program select register for setting said mode control register and a switch for setting said program select register.

22. A system in accordance with claim 19, wherein said system includes a data register for setting said mode control register in response to said start signal or said stop cue.

23. A system in accordance with claim 19, wherein said system includes audio reproducer means for supplying said start signal.

24. A system in accordance with claim 19, further compising means for selectively setting said mode control register in its run mode or its stop mode.

25. A system in accordance with claim 24, wherein the last-mentioned means comprises a start-stop switch.

26. A system in accordance with claim 24, wherein the last-mentioned means comprises a pause switch, said system including audio reproducer means for supplying said start signal, said reproducer means being controlled by said pause switch also.

27. A system in accordance with claim 24, wherein the last-mentioned means comprises an intervalometer.

28. A system in accordance with claim 27, wherein said intervalometer comprises variable repetitive timing wave generator means for cyclically setting said mode control register in its run and stop modes at a selected rate.

29. A system in accordance with claim 24, wherein the last-mentioned means comprises single film frame advancement means for advancing said film by one frame each time the advancement means is actuated.

30. A system in accordance with claim 29, wherein said advancement means comprises a bistable circuit placed in one state by a switch and in another state in response to a feedback from said mode control register.

31. A system in accordance with claim 19, wherein said means for setting said mode control register in its stop mode is normally responsive to both stop cues and program locator elements, but is responsive only to program locator elements when said mode control register is set in run mode in response to said program select control.

32. A system in accordance with claim 19, wherein said film drive mechanism comprises a cyclically moving claw which normally engages said film during a portion of its movement, and wherein said mode control register has means associated therewith for preventing the engagement of said film by said claw when said mode control register is in its stop mode.

* * * * *